Patented May 10, 1949

2,469,529

UNITED STATES PATENT OFFICE 2,469,529

PROCESS OF RECLAIMING VULCANIZED RUBBER SCRAP

Lyndon B. Tewksbury, Jr., Potsdam, N. Y., and Louis H. Howland, Waterbury, Conn., assignors to United States Rubber Company, New York, N. Y., a corporation of New Jersey No Drawing. Application June 5, 1946, Serial No. 674,628

9 Claims. (Cl. 260—720)

This invention relates to a process for reclaiming vulcanized rubber scrap, including so-called "scorched" stocks, from natural rubber, or from synthetic rubbers, such as polymerized chloro-2-butadiene-1,3 commercially known as neoprene or GR-M rubber, copolymers of butadiene-1,3 and styrene, commercially known as Buna S or GR-S rubber, and copolymers of butadiene-1,3 and acrylonitrile, commercially known as Buna N or GR-A rubber, or from mixtures of such synthetic rubbers, or from mixtures of natural rubber with such synthetic rubbers.

We have discovered that bis(alkoxy aryl) disulfides are excellent reclaiming aids which can be used in small amounts to replace large amounts of the softening oils customarily used in the conventional rubber reclaiming processes, such as the "digester" process, the "heater" process, and the so-called mechanical process.

In the usual "digester" process, a charge of ground vulcanized rubber scrap and about 100 to 300 parts by weight of water per 100 parts of scrap, or a solution of a cellulose-destroying chemical, such as caustic soda or zinc chloride, is heated under pressure in a closed steam jacketed container equipped with an agitator until the fiber in the scrap is partially or wholly destroyed, and the rubber becomes plasticized. The charge is then washed free from any such added chemicals, and is dried and milled. In the usual "heater" process, ground rubber scrap in a dried, or somewhat moistened condition (about 1 to 10 parts by weight of water per 100 parts of scrap), is heated with live steam under pressure in trays or pans in an autoclave until the rubber becomes plasticized. The plasticized scrap is then removed from the "heater" and milled. The so-called mechanical process is essentially a mechanical working of the dry rubber scrap at elevated temperature in a Banbury mixer or on a mill. It is customary in these three processes to mix reclaiming oils with the vulcanized scrap in the reclaiming treatment. These oils are a considerable item of expense, and in some types of scrap a comparatively large percent of oils are necessary to sufficiently soften the scrap in the reclaiming operation to give the reclaim a viscosity that is useful for milling and compounding. A large part of the oils added to the vulcanized rubber scrap remains in the finished reclaim and lowers the quality. As a rule, reclaimed rubber high in oil content has a lower tensile strength and decreased wearing properties.

We have found that vulcanized natural or synthetic rubber or mixtures thereof may be satisfactorily reclaimed, and the reclaiming operation may be hastened materially, and appreciable quantities of the usual reclaiming oils may be dispensed with, if small percentages of bis(alkoxy aryl) disulfides are added to the reclaiming mix before heating. The amount of bis(alkoxy aryl)-disulfide is not critical, and may vary from 0.05 to 1% by weight of the scrap in the case of natural rubber or mixtures of natural and synthetic rubbers containing only a small amount of synthetic rubber, and up to 6% or more by weight of the scrap in the case of scrap containing large amounts or composed wholly of vulcanized synthetic rubbers. The chemicals are especially valuable in the reclaiming of the synthetic rubbers, as they obviate the incorporation of the otherwise necessary large quantities of oils which are deleterious to the properties of the reclaim. The bis(alkoxy aryl) disulfides may be added as liquids either as such, or suspended in water as in the "heater" or "digester" process, or in organic solvents, particularly the reclaiming oils that may also be used in the reclaiming processes. The reclaiming in the "digester" or "heater" or so-called mechanical process may take place at the usual reclaiming temperatures of at least 300° F. In general, the "digester" and "heater" reclaiming take place at temperatures from about 300° F. to about 420° F., and the temperature of the mechanical reclaiming process may go higher to about 550° F.

The bis(alkoxy aryl) disulfides may be prepared by the oxidation of an alkoxy thiophenol as exemplified by the preparation of 4,4'-dithiobisanisole- (4,4'-dimethoxy diphenyl disulfide) in Beilstein, VI, 863, 4th edition. A preferred method of preparing the bis(alkoxy aryl) disulfides is by the alkylation of the phenolic disulfides, as will be illustrated in Examples I to III below. The alkoxy group in the bis(alkoxy aryl) disulfides may be saturated or unsaturated, e. g. methoxy, ethoxy, propoxy, butoxy, allyloxy, methallyloxy. The aryl group in the bis(alkoxy aryl) disulfides may have a benzene or naphthylene nucleus and may be unsubstituted, or substituted as with alkyl, aryl, aralkyl or cycloalkyl substituents. The preferred bis(alkoxy aryl) disulfides are the dialkoxy ditolyl disulfides prepared by the alkylation of technical dicresyl disulfide, which is a mixture of the isomeric di-hydroxytolyl disulfides, e. g. dithio bis(methoxy toluene) or dimethoxy ditolyl disulfide (Example I); dithio bis(ethoxy toluene) (Example II); dithio bis (allyloxy toluene) (Example III); dithio bis(isopropoxy - toluene); dithio bis(n-butoxytoluene); dithio bis(methallyloxytoluene). Examples of other bis(alkoxy aryl) disulfides which are effective rubber reclaiming aids are 4,4'-dithio bisanisole or 4,4'-dimethoxy diphenyl disulfide; 2,2'-dithio bisanisole; 2,2'-dithio bisphenetole or 2,2'-diethoxy diphenyl disulfide; 2,2'-dithio bis(4-phenylanisole); 2,2'-dithio bis(4-t-amylphenetole); 2,2'-dithio bis(4-t-butylanisole); 2,2'-dithio bis(4-cyclohexylanisole).

The preparation of the present preferred embodiments of the invention are shown in Examples I to III.

EXAMPLE I

*Preparation of dithio bis(methoxytoluene)*

70 grams (0.25 mol) of technical dicresyl sulfide from cresylic acid and sulfur chloride were dissolved in a solution of 20 grams of sodium hydroxide in 200 cc. of water. The solution was cooled to below 0° C. To the cold solution were added drop-wise with stirring 63 grams (0.5 mol) of methyl sulfate. After completion of the addition, the mixture was heated on a steam bath for half an hour. Since it was then acid, another half mol of sodium hydroxide was added and the heating continued for another half hour. 47 grams more of methyl sulfate were then added simultaneously with 20 grams more of sodium hydroxide to the hot reaction mixture and the heating on the steam bath was continued for four hours longer. The oil was extracted from the cooled reaction mixture with ether in two successive extractions. The combined ether extracts were washed with 3-N sodium hydroxide and finally with salt solution to neutrality. The extract was dried and the ether evaporated, leaving 69.6 grams of a black mobile oil which was the dithio bis(methoxytoluene). Analysis showed 86% methylation of the hydroxyls (OH groups) of the dicresyl disulfide.

EXAMPLE II

*Preparation of dithio bis(ethoxytoluene)*

11.5 grams (0.5 mol) of sodium metal were dissolved in 250 cc. of anhydrous ethanol. 70 grams (0.25 mol) of technical dicresyl sulfide containing the various isomeric dicresyl disulfides were dissolved in the sodium alcoholate solution and 113.4 grams (0.728 mol) of dried ethyl iodide were slowly run in. The mixture was refluxed on a steam bath for two hours. The unreacted ethyl iodide and alcohol were then removed by distillation. The residue was cooled and treated with a mixture of water and ether, the latter to extract the reaction product. The ether extract was shaken with 400 cc. of 2-N sodium hydroxide and then washed neutral with water. It was dried over sodium sulfate and the ether evaporated. To rid of a small amount of residual water, the oil was taken up in benzene, dried over sodium sulfate, and the benzene evaporated, leaving 63.5 grams of a dark colored oil which was the dithiobis(ethoxytoluene). Analysis showed 92% of the hydroxyls of the dicresyl disulfide were ethylated.

EXAMPLE III

*Preparation of dithio bis(allyloxytoluene)*

55.6 grams (0.2 mols) of technical dicresyl sulfide, 54.4 grams (0.45 mol) of allyl bromide, 62.0 grams (0.45 mol) of potassium carbonate and 100 cc. of acetone were mixed and refluxed on a steam bath for fourteen hours. The acetone was removed by distillation and the residual mixture was taken up in water and benzene. The benzene extract was shaken with three successive portion of 2-N sodium hydroxide, washed neutral, dried, and the benzene evaporated, the last traces being removed by heating in vacuo. The product was a block mobile oil which was the dithiobis(allyloxytoluene). Analysis showed 98% of the hydroxyls of the dicresyl disulfide were allylated.

Natural rubbers, such as *Hevea brasiliensis* and guayule, may be reclaimed with the aid of the bis (alkoxy aryl) disulfides of the present invention. Synthetic rubbers which are polymers of butadienes-1,3 and copolymers of butadienes-1,3 with other polymerizable compounds which are capable of forming copolymers with butadienes-1,3 may be reclaimed with the aid of the bis (alkoxy aryl) disulfides, as well as mixtures of such synthetic rubbers and mixtures of natural rubber with such synthetic rubbers. Examples of butadienes-1,3 which alone, or in admixture, may be polymerized to synthetic rubber, are polymerized butadiene-1,3, methyl-2-butadiene-1,3 (isoprene), chloro-2-butadiene-1,3 (chloroprene), piperylene, 2,3-dimethylbutadiene-1,3. Illustrative of the other polymerizable compounds which, singly or in admixture, are capable of forming synthetic rubber copolymers with such butadienes-1,3, as referred to above, are compounds which contain a $CH_2=C<$ group where at least one of the disconnected valences is attached to an electro-active group, that is, a group which substantially increases the electrical dissymmetry or polar character of the molecule. Such copolymerizable compounds may be present in amounts up to 70% by weight of the mixture with butadiene-1,3 to form synthetic rubbers. Examples of compounds which contain a $CH_2=C<$ group and are copolymerizable with butadienes-1,3 are aryl olefins, such as styrene and vinyl naphthalene; the alpha methylene carboxylic acids, and their esters, nitriles, and amides such as acrylic acid, methyl acrylate, methyl methacrylate, acrylonitrile, methacrylonitrile, methacrylamide; isobutylene; methyl vinyl ether; methyl vinyl ketone; vinylidene chloride. The expression "a rubber" as used herein refers to such natural and artificial rubbers. Present day commercial synthetic rubbers of the above types are polymerized chloro-2-butadiene-1,3, known as neoprene or GR-M rubber, copolymers of butadiene-1,3 and styrene, known as Buna S or GR-S rubber, and copolymers of butadiene-1,3 and acrylonitrile, known as Buna N or GR-A rubber.

The following Examples IV to VI illustrate the reclaiming of vulcanized natural (Hevea) rubber and synthetic rubber scraps, which may be softened down to a workable condition with the aid of the bis(alkoxy aryl) disulfides of the present invention. The effectiveness of a reclaiming operation in recovering a scrap vulcanized rubber may be quantitatively shown by means of an instrument widely used for this purpose in the reclaim rubber industry, namely, the Mooney shearing disc plastometer. This device has been described by M. Mooney in Industrial and Engineering Chemistry, an. ed., 6, 147 (1934). By means of this device the viscosity of a plastic material in shear may be readily and quantitatively measured. Experience has shown that materials with a Mooney viscosity of 80 to 180 when tested at 180° F. can be readily and efficiently processed on standard rubber working machinery, but that materials of a very high viscosity such as around 200 and over when tested at 180° F. cannot be so treated.

EXAMPLE IV

In this case ground vulcanized natural rubber scrap with small amounts of pine oil fraction (conventional reclaiming oil, essentially dipentene) and water were treated in a "heater" under live steam pressure at 365° F. for sixteen hours with and without the addition of small amounts of various bis(alkoxy aryl) disulfides. After these treatments the reclaims were removed from the "heater," dried and subjected to the usual milling process. Mooney viscosities were run on the reclaims. The following table gives the formulations of the scrap charges and the Mooney viscosities at 180° F. of the reclaims:

| Charge, Parts by Weight | A | B | C | D |
|---|---|---|---|---|
| Ground Vulcanized Natural Rubber Scrap | 100 | 100 | 100 | 100 |
| Pine Oil Fraction | 2 | 2 | 2 | 2 |
| Dithio bis(methoxytoluene) | | 0.3 | | |
| Dithio bis(ethoxytoluene) | | | 0.3 | |
| Dithio bis(allyloxytoluene) | | | | 0.3 |
| Water | 2 | 2 | 2 | 2 |
| Mooney Viscosity | 195 | 84 | 103 | 95 |

The above table shows a material softening of the vulcanized natural rubber scrap by virtue of the addition of a small amount of bis(alkoxy aryl) disulfide in the reclaiming operation.

EXAMPLE V

In this case ground vulcanized GR-S scrap (synthetic rubber copolymer of about 75 parts by weight of butadiene-1,3 and about 25 parts by weight of styrene) with small amounts of pine oil fraction and rosin oil (conventional reclaiming oils) and water were treated in a "heater" under live steam pressure at 365° F. for sixteen hours with and without the addition of small amounts of various bis(alkoxy aryl) disulfides. After these treatments the reclaims were removed from the "heaters," dried, and subjected to the usual milling process. Mooney viscosities were run on the reclaims. The following table gives the formulations of the scrap charges and the Mooney viscosities at 180° F. of the reclaims:

| Charge, Parts by Weight | E | F | G | H |
|---|---|---|---|---|
| Ground Vulcanized GR-S Scrap | 100 | 100 | 100 | 100 |
| Pine Oil Fraction | 15 | 15 | 15 | 15 |
| Rosin Oil | 5 | 5 | 5 | 5 |
| Dithio bis(methoxytoluene) | | 6 | | |
| Dithio bis(ethoxytoluene) | | | 6 | |
| Dithio bis(allyloxytoluene) | | | | 6 |
| Water | 2 | 2 | 2 | 2 |
| Mooney Viscosity | over 200 | 90 | 102 | 71 |

The above table shows a material softening of the vulcanized GR-S rubber scrap by virtue of the addition of a small amount of bis(alkoxy aryl) disulfide in the reclaiming operation.

EXAMPLE VI

In this case ground vulcanized neoprene scrap (synthetic rubber polymer of chloro-2-butadiene-1,3) with small amounts of pine oil fraction and rosin oil and water were treated in a "heater" under live steam pressure at 365° F. for sixteen hours with and without the addition of a small amount of dithio bis(methoxytoluene). After these treatments the reclaims were removed from the "heaters," dried, and subjected to the usual milling process. Mooney viscosities were run on the reclaims. The following table gives the formulations of the scrap charges and the Mooney viscosities at 180° F. of the reclaims:

| Charge, Parts by Weight | I | J |
|---|---|---|
| Ground Vulcanized Neoprene Scrap | 100 | 100 |
| Pine Oil Fraction | 15 | 15 |
| Rosin Oil | 5 | 5 |
| Dithio bis(methoxytoluene) | | 6 |
| Water | 2 | 2 |
| Mooney Viscosity | over 200 | 88 |

The above table shows a material softening of the vulcanized neoprene scrap by virtue of the addition of a small amount of bis(alkoxy aryl) disulfide in the reclaiming operation.

In view of the many changes and modifications that may be made without departing from the principles underlying the invention, reference should be made to the appended claims for an understanding of the scope of the protection afforded the invention.

Having thus described our invention, what we claim and desire to protect by Letters Patent is:

1. A process for reclaiming scrap containing vulcanized rubber selected from the group consisting of natural rubber, polymers of butadiene-1,3, and copolymers of butadienes-1,3 with compounds which contain a $CH_2=C<$ group and are copolymerizable with butadienes-1,3, which comprises heating the scrap in the presence of a small amount of a bis(alkoxy aryl) disulfide in which the alkoxy groups contain from 1 to 4 carbon atoms for a time sufficient to materially soften the scrap.

2. A process for reclaiming scrap containing vulcanized rubber selected from the group consisting of natural rubber, polymers of butadiene-1,3, and copolymers of butadienes-1,3 with compounds which contain a $CH_2=C<$ group and are copolymerizable with butadienes-1,3, which comprises heating the scrap in the presence of a small amount of dithio bis(alkoxy toluene) in which the alkoxy groups contain from 1 to 4 carbon atoms for a time sufficient to materially soften the scrap.

3. A process for reclaiming scrap containing vulcanized rubber selected from the group consisting of natural rubber, polymers of butadiene-1,3, and copolymers of butadienes-1,3 with compounds which contain a $CH_2=C<$ group and are copolymerizable with butadienes-1,3, which comprises heating the scrap in the presence of a small amount of dithio bis(methoxy toluene) for a time sufficient to materially soften the scrap.

4. A process for reclaiming scrap containing vulcanized rubber selected from the group consisting of natural rubber, polymers of butadiene-1,3, and copolymers of butadienes-1,3 with compounds which contain a $CH_2=C<$ group and are copolymerizable with butadienes-1,3, which comprises heating the scrap in the presence of a small amount of dithio bis(ethoxy toluene) for a time sufficient to materially soften the scrap.

5. A process for reclaiming scrap containing vulcanized rubber selected from the group consisting of natural rubber, polymers of butadiene-1,3, and copolymers of butadienes- 1,3 with compounds which contain a $CH_2=C<$ group and are copolymerizable with butadienes-1,3, which comprises heating the scrap in the presence of a small amount of dithio bis(allyloxytoluene) for a time sufficient to materially soften the scrap.

6. A process for reclaiming scrap containing vulcanized rubber selected from the group consisting of natural rubber, polymers of butadiene-1,3, and copolymers of butadienes- 1,3 with compounds which contain a $CH_2=C<$ group and are copolymerizable with butadienes-1,3, which comprises heating the scrap in the presence of a small amount of a bis(alkoxy aryl) disulfide in which the alkoxy group contain from 1 to 4 carbon atoms at a temperature at least 300° F. and for a time sufficient to materially soften the scrap.

7. A process for reclaiming scrap containing vulcanized rubber selected from the group consisting of natural rubber, polymers of butadiene-1,3, and copolymers of butadienes- 1,3 with compounds which contain a $CH_2=C<$ group and are copolymerizable with butadienes-1,3, which comprises heating the scrap in the presence of a small amount of a bis(alkoxy aryl) disulfide in which the alkoxy groups contain from 1 to 4 carbon atoms at a temperature at least 300° F. and for a time sufficient to reduce the vulcanized rubber to a plastic state where it has a Mooney viscosity of 80 to 180 when tested at 180° F.

8. A process for reclaiming scrap containing vulcanized natural rubber which comprises heating the scrap in the presence of a small amount of a bis(alkoxy aryl) disulfide in which the alkoxy groups contain from 1 to 4 carbon atoms for a time sufficient to materially soften the scrap.

9. A process for reclaiming scrap containing vulcanized natural rubber which comprises heating the scrap in the presence of a small amount of dithio bis(methoxy toluene) for a time sufficient to materially soften the scrap.

LYNDON B. TEWKSBURY, Jr.
LOUIS H. HOWLAND.

REFERENCES CITED

The following references are of record in the file of this patent:

UNITED STATES PATENTS

| Number | Name | Date |
| --- | --- | --- |
| 2,359,122 | Kirby et al. | Sept. 26, 1944 |
| 2,372,584 | Kirby et al. | Mar. 27, 1945 |